United States Patent [19]

Lautzenhiser

[11] Patent Number: 4,457,077
[45] Date of Patent: Jul. 3, 1984

[54] BOREHOLE GRADIOMETER

[75] Inventor: Theodore V. Lautzenhiser, Tulsa, Okla.

[73] Assignee: Standard Oil Company, Chicago, Ill.

[21] Appl. No.: 510,797

[22] Filed: Jul. 5, 1983

[51] Int. Cl.³ .......................................... E21B 47/022
[52] U.S. Cl. ...................................... 33/304; 33/308; 33/312
[58] Field of Search ................. 33/304, 302, 303, 301, 33/308, 312; 73/151, 152

[56] References Cited

U.S. PATENT DOCUMENTS

| 3,587,176 | 6/1971 | Schnerb | 33/312 |
| 3,693,142 | 9/1972 | Jones | 33/308 |
| 3,862,499 | 1/1975 | Isham et al. | 33/302 |
| 4,199,869 | 4/1980 | Van Steenwyk | 33/302 |
| 4,244,116 | 1/1981 | Barriac | 33/304 |

OTHER PUBLICATIONS

"Linearization & Calibration of Electrostatically Fed-back Gravity Meters"; *Journal of Geophysical Research;* p. 928; vol. 75, No. 5, Feb. 10, 1979.

"Measurements in the Earth Mode Frequency Range . . ."; *Journal of Geophysical Research;* vol. 71, No. 18, p. 4361, Sep. 15, 1966.

*Primary Examiner*—Willis Little
*Attorney, Agent, or Firm*—Scott H. Brown; Timothy D. Stanley

[57] ABSTRACT

An apparatus and its use for measuring the differences in gravity at spaced locations in a wellbore. The apparatus includes first and second gravity measuring devices mounted at spaced vertical positions from each other and encapsulated for movement through a wellbore. A first electrical control current, proportional to the force of gravity acting upon the first gravity measuring device, is provided as a bias current to a second electrical control current. The second electrical control current is indicative of differences in gravity forces detected by the first and second gravity measuring devices, thereby providing a gravitational gradient reading.

12 Claims, 2 Drawing Figures

BOREHOLE GRADIOMETER

BACKGROUND OF THE INVENTION

1. Field of the Invention

The present invention relates to a device to measure the gravitational forces in a wellbore and, more particularly, to such a device which is used to measure the gravity difference between two different locations in a wellbore for use in calculating the bulk density of a subterranean formation.

2. Setting of the Invention

For geological exploration and hydrocarbon production purposes it is very helpful to know the bulk density of a subterranean formation. Often, to obtain the bulk density of the formation, a gravitymeter is lowered into a wellbore and a gravity reading is taken at a first location in the wellbore adjacent one part of the formation. The gravitymeter is then lowered and stopped at a second location in the wellbore adjacent the formation. A second gravity reading is taken and the two gravity readings are used to calculate the bulk density of the formation.

The use of conventional gravitymeters to obtain an accurate gravity reading is generally a time consuming and tedious operation which requires a skilled and attentive operator. The operator first levels the gravitymeter within the wellbore and, then, "nulls" the gravitymeter, which means that a gravity sensing device within the gravitymeter is adjusted to be in balance between the downward force of gravity and adjustable counterbalancing force(s). To null the gravitymeter, the operator adjusts the counterbalancing force(s) in response to the movement of a chart recorder at the surface, which indicates the relative position of the gravity sensing device. Once the gravitymeter has been nulled, the operator calculates the gravity reading from the amount of counterbalancing force(s) required to null the gravitymeter. Thereafter, the gravitymeter is raised or lowered to the new location, leveled and nulled, and the operator obtains a second gravity reading. The operator can then calculate the bulk density of the formation.

Other devices have been designed to be used as gravitymeters and one such device is called an accelerometer and consists of two spaced, parallel and horizontal magnets with the same polarity, either North or South, adjacent one another. Spaced between the magnets is a mass which is hingeably connected at one end to the accelerometer's housing to allow for vertical movement of the mass between the magnets. Two spaced horizontal and parallel plates are provided adjacent the magnets and the mass. The plates form part of a capacitive position indicator (CPI) circuit used to sense the relative position of the mass between the plates. The use of CPI circuits to sense the position of a mass, such as in a gravitymeter, is illustrated in "Linearization and Calibration of Electrostatically Feedback Gravity Meters", Moore and Farrell, Journal of Geophysical Research, Vol. 75, No. 5, Feb. 10, 1979, and "Measurements in the Earth Mode Frequency Range by an Electrostatic Sensing and Feedback Gravimeter" Black and Moore, Journal of Geophysical Research, Vol. 71, No. 18, Sept. 15, 1966, which is incorporated herein by reference. The electrical output from the CPI circuit is used to generate a control current which is applied to the mass to create electromagnetic forces to move the mass to a null position between the magnets. These electromagnetic forces move the mass to a central position, where the mass is in balance between the downward force of gravity on the mass and the centralizing electromagnetic forces. A measurement of this control current can be converted into a representation of the gravity at the location in wellbore.

A serious problem with the use of an accelerometer as a borehole gravitymeter is that the equipment utilized to measure the control current does not have the necessary accuracy for a measurement of this control circuit to be converted into a representation of the gravity with the accuracy needed for borehole gravity and bulk density surveys. For example, in measuring the output from an accelerometer the value needs to be measured to about nine (9) significant figures, such as 980000101 microamps. However, the equipment capable of measuring the output has as its best tolerance ±100 microamps, which is too wide of a tolerance for use in calculating gravity measurements. In such an example, the current needs to be measured to within ±0.5 microamps for use in calculating gravity measurements. To increase the accuracy of the gravity readings from an accelerometer, devices have been developed to generate a constant or bias current, such as a constant current of 980,000,000 microamps, which is introduced into the CPI circuit and the control current; thereby, the resulting control current would not need to be measured to the nine significant figures but only two or three. However, after years of effort and large amounts of money spent to develop such a device to generate the bias current, the devices developed as of this date have an output tolerance of about ±20 microamps, which is still too wide for use in gravity and bulk density surveys.

There exists a need for a gradiometer device which does not require leveling and nulling and which produces a highly accurate gravity difference reading, without the problems associated with the devices described above.

SUMMARY OF THE INVENTION

The present invention is a borehole gravity gradiometer contemplated to overcome the foregoing disadvantages. The borehole gravity gradiometer measures the differences in the force of gravity at different depths in a wellbore, and includes first and second gravity measuring devices in spaced vertical position to each other. Circuitry to provided to form a first and second control current in response to the force of gravity acting upon the first and second gravity measuring devices, respectively. Circuitry is included to add the first control current to the second control current in the second device, thereby value of the second control current is proportional to the differences in gravity sensed by the first and second gravity measuring devices.

In one embodiment of the present invention the gravity measuring devices are accelerometers and are encased in an elongated housing for placement in a wellbore. The gravity measuring devices are connected via a wireline to a surface control unit, which can include a microprocessor which is used to calculate the bulk density of a formation from the measurement of the second control current.

DETAILED DESCRIPTION OF PREFERRED EMBODIMENT

The present invention comprises a borehole gravity gradiometer which is used to measure the difference in gravity at different locations in a wellbore. The gradiometer of the present invention includes a first gravity measuring device which has circuitry to form a first control current in response to the force of gravity acting upon the first gravity measuring device. A second gravity measuring device is disposed in space vertical position from the first gravity measuring device and includes circuitry to form a second control current in response to the force of gravity acting upon the second gravity measuring device. Electrical circuitry is included for providing the first control current as a bias current to the second control current, such that a measurement of the second control current is proportional to the difference in gravity sensed by the first and second gravity measuring devices.

The difference in the gravity readings from the first and second gravity measuring device can be used in the bulk density equation:

$$\rho = \frac{8}{3}\bar{\rho}_e - \frac{1}{4\pi G}\frac{\partial g_z}{\partial z} \quad [1]$$

where $\rho$ equals the bulk density, $\bar{\rho}_e$ is the earth's average density, and G is the gravity constant.

This is because the value of $\partial g_z/\partial z$ in equation [1] is equal to the following equation:

$$\frac{\partial g_z}{\partial z} = \frac{g(z_2) - g(z_1)}{z_2 - z_1} \quad [2]$$

where $g(z_1)$ is the gravity reading taken at the first location in the wellbore, $g(z_2)$ is equal to the gravity reading taken at the second location in the wellbore, $z_1$ is the depth of the gravity measuring device in the wellbore when $g(z_1)$ was taken, and $z_2$ is equal to the depth in the wellbore of the gravity measuring device when $g(z_2)$ was taken. A discussion of the importance of these equations will be provided later.

The gravity measuring devices for use with the present invention can be any commercially available gravity measuring devices which use an electrical current to create forces to counteract the gravitational forces. One type of such preferred gravity measuring devices are commonly called accelerometers and one type of these are labeled M-9 and M-11 accelerometers and marketed by Bell Aero Space Corporation.

Figure 1:
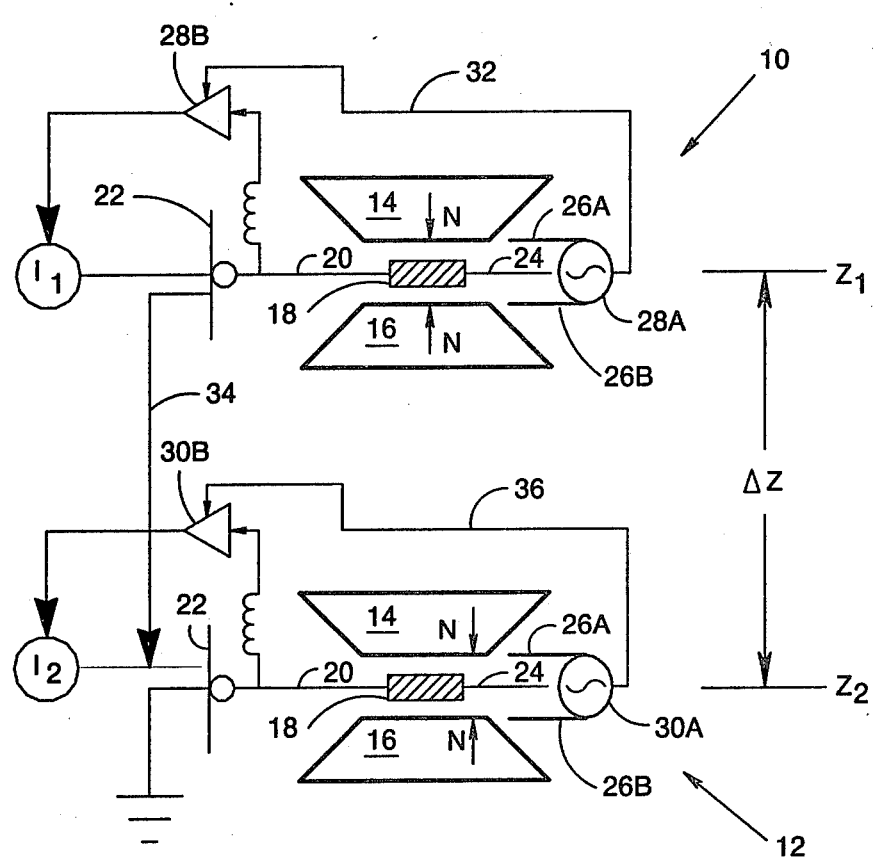
FIG. 1 is a diagrammatic representation of two gravity measuring devices and related circuitry embodying the present invention.
Figure 2:
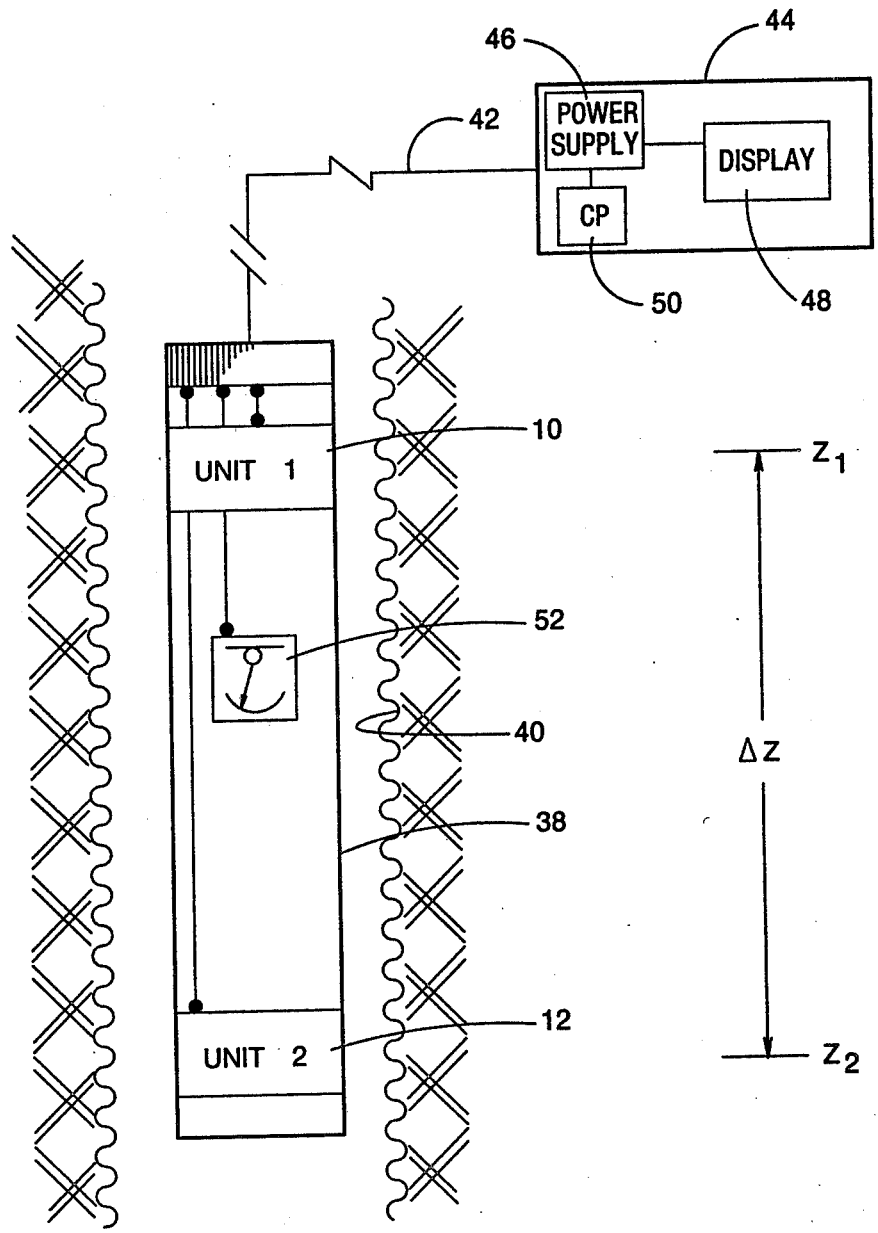
FIG. 2 is a semi-diagrammatic representation of the present invention with a downhole portion thereof suspended in a wellbore and connected via a wireline to a surface control unit.

As shown in FIGS. 1 and 2, a first gravity measuring device 10, such as an accelerometer, and a second gravity measuring device 12 are mounted in vertical spaced relationship to each other and both include an upper magnet 14 and a spaced and horizontally parallel identical magnet 16. The magnets 14 and 16 each have the same pole, either North or South, facing each other to form a field of magnetic force in opposition to each other. Spaced between the two magnets 14 and 16 is a weight or mass 18 connected to a bar 20, which is hingeably connected at one end to a support 22 within the housing (not shown) of each of the gravity measuring devices 10 and 12. In one embodiment, an extension 24 can be connected to the mass 18 in parallel with the bar 20 and is free to move vertically between two spaced, parallel and horizontal plates 26a and 26b. The plates 26a and 26b are part of a capacitive position indicator (CPI) circuit 28 which includes a signal generator or source 28A and a phase detecting error amplifier 28B used to sense the relative position of the extension 24 and the mass 18 between the plates 26a and 26b and to create forces to be applied to the mass 18 to move the mass 18 to a central position. Further, a CPI circuit 30 is included for the second gravity measuring device 12 which includes a signal generator or source 30A and a phase detecting error amplifier 30B. In the CPI circuit 28 for the first gravity sensing device 10 and CPI circuit 30 for the second gravity sensing device 12 a voltage is applied to the plates 26a and 26b and the relative capacitance of the plates is converted to a voltage proportional to the position of the extension 24 between the plates 26a and b. An AC voltage is applied to each of the plates 26a and b with this voltage 180° out of phase on each plate and the position of the extension 24 between the plates 26a and b causes a change in the induced voltage on the extension 24. This change in the induced voltage is phase-detected by the CPI circuits 28 and 30 and is proportional to the relative position of the extension 24 between the magnets 14 and 16.

The output or current of the CPI circuit 28 is passed through electrical circuitry 32 onto the bar 20 and the mass 18. This current forms electromagnetic forces on the mass 18, which act in the same manner as a torque coil, to force the mass 18 to a position essentially half way between the magnets 14 and 16. The measurement of this current is an indication of the force required to move the mass 18 to a balanced or neutral position between the magnets 14 and 16, and thereby directly proportional to the force of gravity acting upon the mass 18.

The output of the CPI circuit 28 is transferred via the circuitry 32 onto the bar 20 and mass 18 to form the magnetic forces needed to move the mass 18 and to maintain the mass 18 in the balanced position. This current, formed by the CPI circuit 28, will hereinafter be called the first control current. This first control current is passed via an electrical circuitry 34 to the bar 20 and mass 18 of the second gravity measuring device 12. In like manner as described above, the output of the CPI circuit 30 is communicated via an electrical circuitry 36 to the bar 20 and the mass 18 to move and to maintain the bar 20 and the mass 18 in a balanced position between the magnets 14 and 16 of the second gravity measuring device 12.

Now that the operation of the gravity measuring devices have been explained, the discussion of their importance to the equations [1] and [2] will be provided. If the gravity measuring devices 10 and 12 were spaced side by side at exactly the same level horizontally and assuming that the gravity measuring devices 10 and 12 were identical, then the first control current (measured at $I_1$) used to maintain the mass 18 of the gravity measuring device 10 in a balanced position would be identical to the current necessary to maintain the second gravity measuring device 12 in the balanced position. However, if the gravity measuring devices 10 and 12 are spaced vertically some distance, $\Delta z$, from each other and there was a measurable difference in the force of gravity acting at depth $z_1$ and depth $z_2$, then the current necessary to balance the gravity measuring device 12 is different from the current at $I_1$ by the current measured at $I_2$. In this case, the second control current, measured at $I_2$, would be directly proportional to the difference in gravity, $g(z_2)-g(z_1)$, measured across $\Delta z$, and can be placed into equation [1] for use in calculating the bulk density.

By applying the first control current to the second control current, as described above, the measurement of the current at $I_2$ will be the difference between the force of gravity at $Z_1$ and $Z_2$. Since this difference will normally be only about $\pm 150$ microamps then, current measuring devices can be utilized to measure this current to only three significant figures rather than the nine significant figures needed before. More importantly such equipment to measure to three significant figures is readily available and with the necessary tolerances needed for gravity measurements, such as 0.5 microamps.

In the operation of one embodiment of the gradiometer of the present invention, the gravity measuring devices 10 and 12 are encapsulated within an elongated tubular housing 38 or sonde, which is suspended within a wellbore 40 via a well service or well logging wireline 42. Connected to the wireline 42 is a surface control unit 44 which includes a power supply 46 and an output display device 48, such as a CRT, plasma discharge screen, chart recorder or the like. A plurality of blanket heaters (not shown) can be included to surround the gravity measuring devices 10 and 12 to maintain them at a desired elevated temperature. In one embodiment, the surface control unit 44 includes a command and calculation microprocessor (CP) 50 which has programmed into its memory the bulk density equation [1] so that, upon activation, the value of the second control current of the gravity measuring device 12 and the known distance between the unit 10 and unit 12 ($\Delta z$) can be used to calculate quickly and accurately the bulk density of the formation opposite which the gradiometer is placed.

The gravity measurements using the present invention provide an accurate representation of the bulk density of the formation for wellbore inclinations under about 9°-10° from vertical. However, for borehole inclinations greater than about 9°-10°, an inclinometer 52 can be mounted within the sonde 38. The output of the inclinometer 52 is sent to the CP 50 and utilized, through known equations stored in the CP 50, to correct the gravity readings from the gravity measuring devices 10 and 12 for the borehole inclination so an accurate bulk density value can be obtained.

With the present wellbore gravity gradiometer, the requirement of leveling and nulling a borehole gravitymeter at one location, taking a first gravity reading and then lowering or raising the gravitymeter to a different location, repeating the leveling and nulling operations, and taking a second gravity reading, has been eliminated. Further, the need for developing a bias current from separate electronic circuitry has been eliminated because the gravity measuring device 10 acts as the source of the bias current for the second gravity measuring device 12, thereby eliminating the need for such additional bias current circuitry.

Whereas the present invention has been described in particular relation to the drawings attached hereto, it should be understood that other and further modifications, apart from those shown or suggested herein, may be made within the scope and spirit of this invention.

We claim:

1. A borehole gravity gradiometer for measuring the differences in gravity at different depths within a wellbore, comprising:

(a) a first gravity measuring means disposed in said wellbore and including means to form a first control current in response to the force of gravity acting at a first depth upon said first gravity measuring means;

(b) a second gravity measuring means disposed within said wellbore in spaced position from said first gravity measuring means and including means to form a second control current in response to the force of gravity acting at a second depth upon said second gravity measuring means; and (c) circuit means for providing said first control current as a bias current to said second control current, whereby said second control current is proportional to the differences in gravity sensed by said first and second gravity measuring means.

2. The apparatus of claim 1 wherein said first and second gravity measuring means comprise accelerometers.

3. The apparatus of claim 1 wherein said first and second gravity measuring means each include a displaceable mass.

4. The apparatus of claim 3 wherein said means to form said first and second control currents each includes:

sensor means for detecting the position of said displaceable mass; and displacement means for applying an electromagnetic force to said displaceable mass in response to said sensor means to move said displaceable mass to a predetermined position.

5. The apparatus of claim 1 wherein said first and second gravity measuring means are vertically disposed within an elongated housing for disposition within a wellbore.

6. The apparatus of claim 1 and including a surface control unit in operative communication with said first and second gravity measuring means.

7. The apparatus of claim 6 wherein said surface control unit includes a microprocessor for converting the value of said second control current into a representation of the bulk density of the formation opposite which said gradiometer is landed.

8. The apparatus of claim 6 and including borehole inclination measurement means in communication with said surface control unit.

9. A method of measuring the gravity gradient between a first gravity measuring means at a first depth and a second gravity measuring means at a second depth within a wellbore and each having a displaceable mass, comprising:

(a) providing a first control current to maintain said displaceable mass of said first gravity measuring means in a predetermined position;

(b) providing said first control current to said second gravity measuring means for use as a bias current in said second gravity measuring means; and (c) forming a second control current in said second gravity measuring means indicative of the gravity differences at the spaced positions in the well-bore.

10. The method of claim 9 further including forming a measure of the bulk density of the formation from said second control current.

11. The method of claim 10 further including compensating the measure of the bulk density of the formation for borehole inclination.

12. The apparatus of claim 7 further including means for compensating the representation of the bulk density of the formation for borehole inclination.

* * * * *